Nov. 2, 1965     O. A. HALEY     3,215,314
GRANULAR MATERIAL MIXING MACHINE
Filed Sept. 13, 1962     3 Sheets-Sheet 1
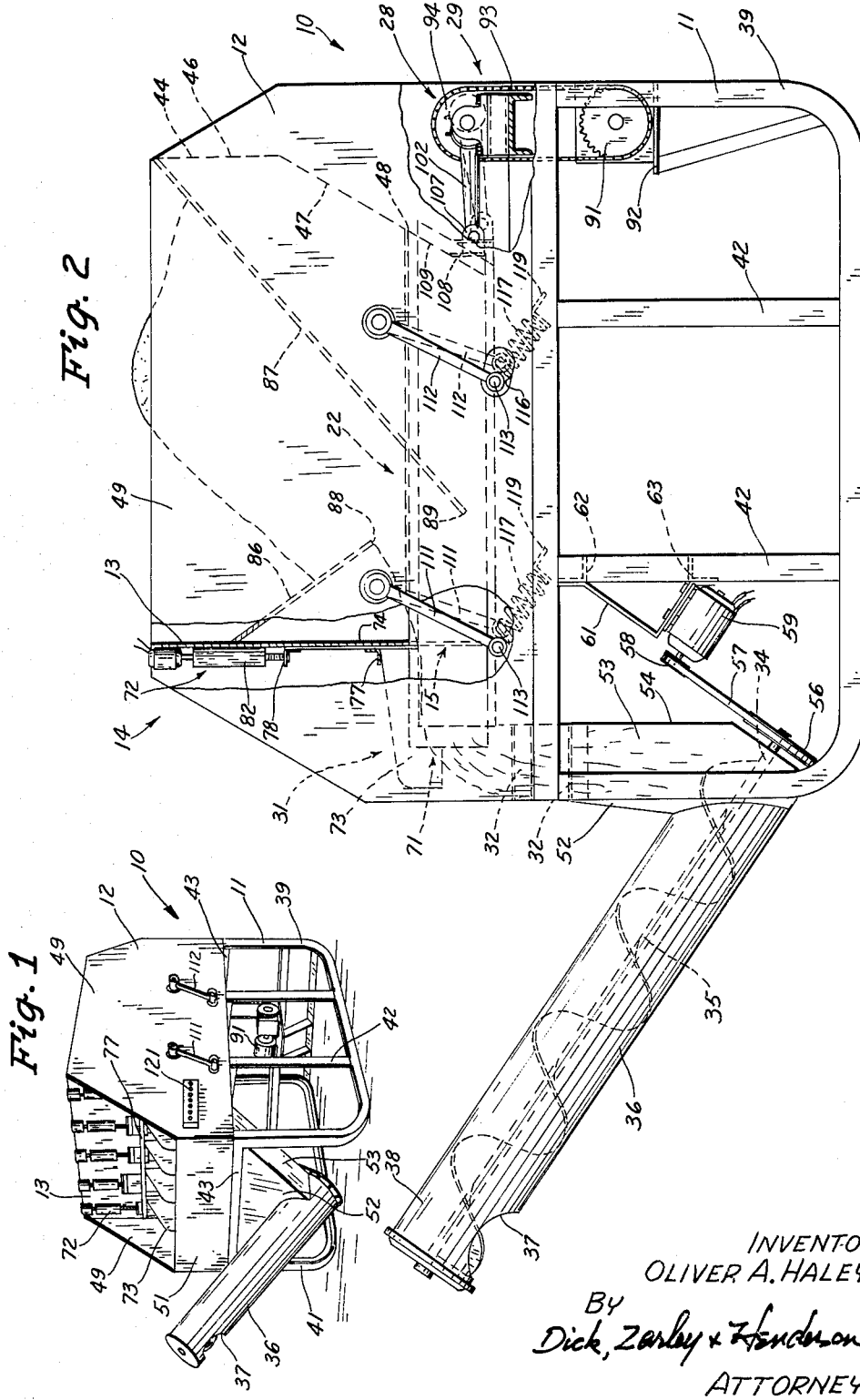
INVENTOR
OLIVER A. HALEY
BY
Dick, Zarley & Henderson
ATTORNEYS

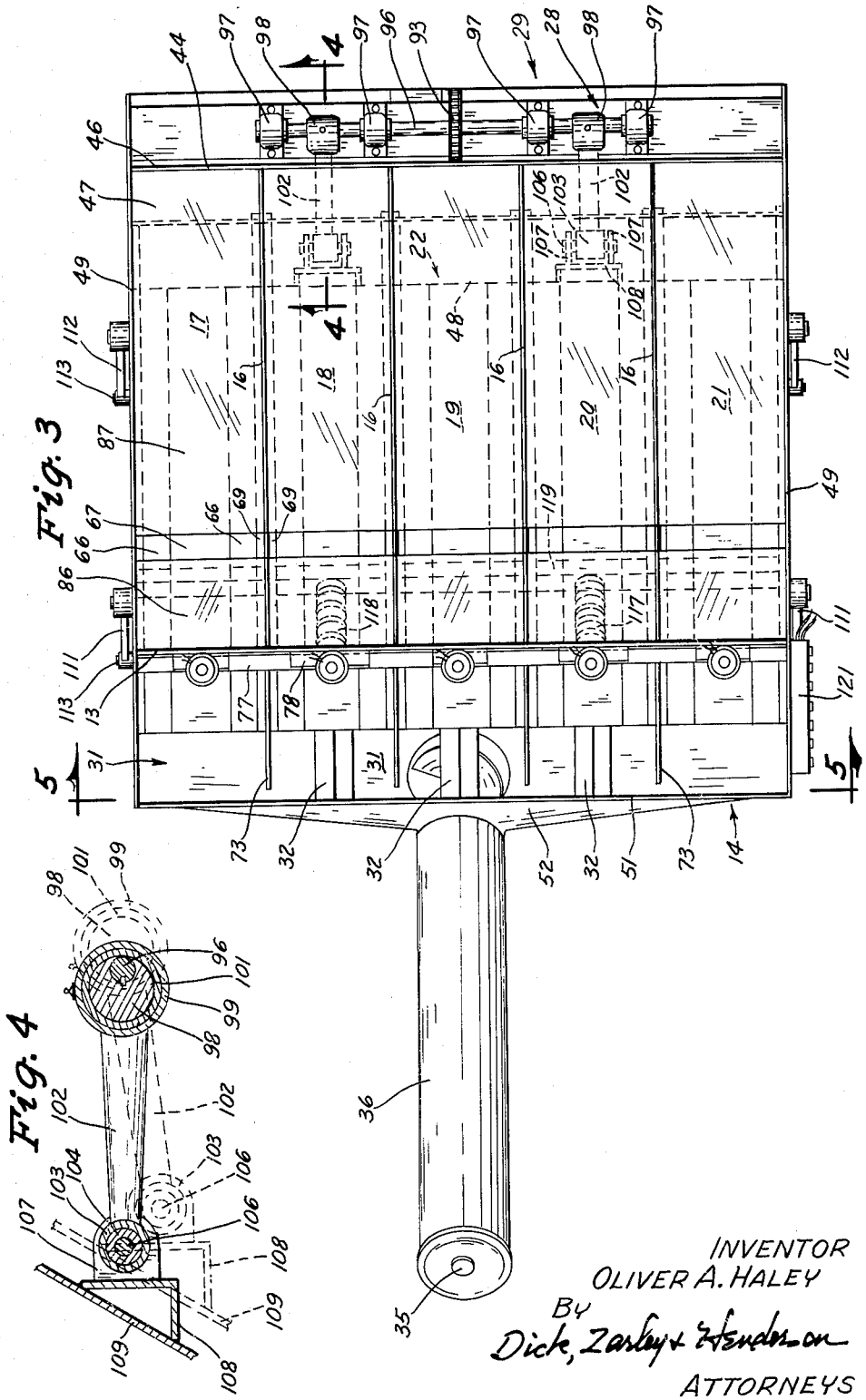

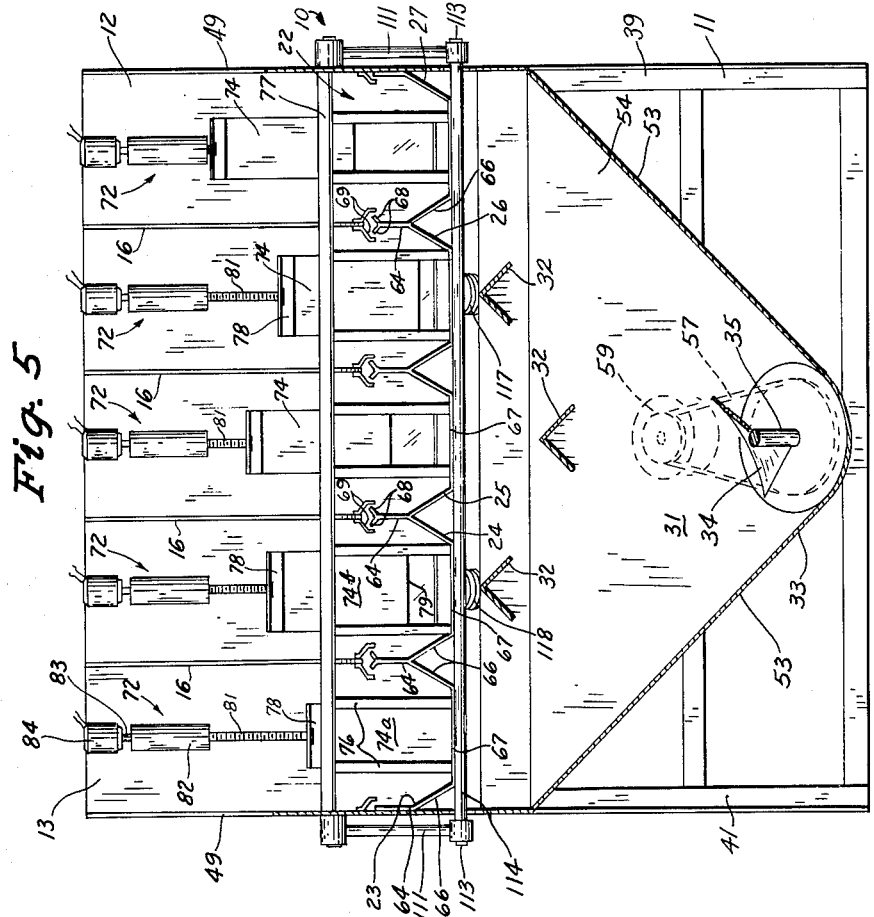
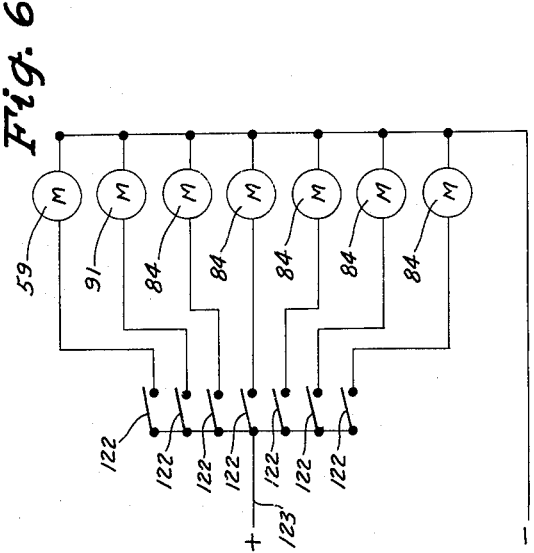

United States Patent Office 3,215,314
Patented Nov. 2, 1965

1

3,215,314
GRANULAR MATERIAL MIXING MACHINE
Oliver A. Haley, 720 14th Place, Nevada, Iowa
Filed Sept. 13, 1962, Ser. No. 223,340
2 Claims. (Cl. 222—136)

This invention relates to machines for mixing materials, and more particularly to a machine for continuously mixing and blending a plurality of different granular materials or the like.

The present day utilization of tremendous quantities of granular materials, for farm use for example, is well known. Those skilled in this field are aware that the usual granular product, whether it be for feed purposes or for fertilizing, is comprised of a great variety of different ingredients, the end product being a blend of these many ingredients. To provide an improved machine capable of mixing and blending a variety of granular materials in a continuous, accurately measured and thorough manner is an object of this invention.

Another object of this invention is to provide a granular material mixing machine including novel reciprocating conveying apparatus in combination with volume adjustment mechanism for providing independent and selective adjustment of the volume for any one or all the materials being mixed.

Yet another object of this invention is to provide a novel combination of structure having a plurality of granular material holding compartments each adapted to discharge a regulated quantity of material into a pan, and with a mechanism for reciprocally conveying the material in all the pans at one time through a plurality of openings of predetermined sizes for mixing and blending purposes.

Still another object of this invention is to provide a machine, wherein a plurality of different materials are discharged through a like plurality of openings of variable sizes, with means for diffusing the materials prior to their being collected together and mixed.

It is another object of this invention to provide a granular material mixing machine capable of attaining the above mentioned objectives which is economical of manufacture, rugged in construction, and effective in service.

These objects and other features and advantages of this invention will become readily apparent upon reference to the following description and the accompanying drawings, wherein:

FIG. 1 is a perspective view of one embodiment of the granular material mixing machine of this invention;

FIG. 2 is an enlarged side elevational view of the machine, certain parts broken away and others shown in dotted lines for clarity of illustration;

FIG. 3 is a top plan view of the machine;

FIG. 4 is an enlarged, fragmentary detail view of one of the reciprocating rods of the structure, showing sequentially alternate positions;

FIG. 5 is a vertical sectional view taken along the line 5—5 in FIG. 3; and

FIG. 6 is a schematic diagram of the electrical circuitry for the machine.

Referring now to the drawings, the granular material mixing machine of this invention is indicated generally at 10 in FIG. 1 and comprises generally a portable skid-type frame 11, an open-bottomed, granular material storage bin 12 mounted on the frame 11 and having a plurality of transversely spaced openings 15 (FIG. 2) formed

2 in an end wall 13 at the front 14 of the machine and a plurality of divider plates 16 (FIG. 3) mounted within the bin 12 to form a plurality of transversely spaced compartments 17, 18, 19, 20 and 21.

The machine 10 comprises further a pan unit 22 including a plurality of substantially U-shaped pans 23, 24, 25, 26 and 27 (FIGS. 2 and 5) each disposed below a respective compartment and adapted to receive granular material therefrom. The pans are reciprocated as a unit by a reciprocating mechanism 28 (FIGS. 2 and 3) mounted on the frame 11 at the rear 29 of the machine 10.

Reciprocation of the pan unit 22 effects a discharge of the material in each pan toward and through the openings 15, from whence the granular material falls downwardly into a discharge compartment 31 (FIGS. 2, 3 and 5). Within the compartment 31 are mounted three inverted V-shaped members 32 which diffuse and otherwise comingle the various materials by tumbling them into each other during their otherwise free fall. At the bottom 33 (FIG. 5) of the compartment 31, the materials are trapped and are then mixed by the lower end 34 of an auger screw 35 while simultaneously being conveyed upwardly through an elevator tube 36 for an elevated discharge through an opening 37 formed in the upper end 38 thereof.

More specifically, the portable skid-type frame 11 includes a pair of U-shaped members 39 and 41 having upright supports 42, and interconnected by transverse cross members 43. The storage bin 12 is secured on top of the frame and includes the front end wall 13 (FIG. 2) a rear end wall 44 (FIGS. 2 and 3) having a depending portion 46 and a portion 47 slanted inwardly and toward the rear end 48 of the pan unit 22, and includes further the side walls 49.

The side walls 49 extend forwardly of the front end wall 13 as best illustrated in FIGS. 1 and 2 and are connected across their vertically shortened front edges by an upright panel 51 to form the upper part of the discharge compartment 31. The lower part of the compartment 31 is formed by an inclined front panel 52 (FIG. 1), a pair of converging side panels 53 (FIG. 5), and a depending and inclined rear panel 54 (FIG. 2). The elevator tube 36 is affixed at its lower end to the compartment 31 walls, and the auger lower end 34 is driven by a pulley wheel 56 (FIG. 2) attached thereto which is rotated by a pulley 57 driven by another pulley wheel 58. The latter is driven by a motor 59 mounted on a bracket 61 secured to a pair of angle irons 62 and 63 (FIG. 2) interconnected between a pair of uprights 42.

The pan unit 22, as mentioned hereinbefore, comprises the pans 23-27 inclusive. Each elongated pan, 23 for example, is substantially U-shaped, having an upper pair of straight depending wall portions 64 (FIG. 5), a pair of lower wall portions 66 slanted inwardly toward each other, and a bottom portion 67. The upper edge of each wall portion 64 is flared inwardly by a flange 68 as best illustrated in FIG. 5. These upper flanges 68 are covered by a pair of angular plates 69 secured on either side of the lower edge of each divider plate 16 (FIG. 3) to prevent grain from collecting therein.

As best illustrated in FIG. 2, the forward portion 71 of the pans extend through the openings 15 and into the discharge compartment 31. To continue the departmentation of the storage bin into the compartment, a secondary divider plate 73 (FIG. 2) extends forwardly of the end wall 13 and in longitudinal alignment with each divider plate 16. Each opening 15 is adjusted as to its size by a gate unit 72 (FIGS. 2 and 5) which includes a vertically disposed gate plate 74 slidably mounted on a pair of runners 76 secured to the end wall 13 and defining the sides of each opening 15. The upper ends of the runners 76 and the secondary divider plate 73 are secured to the lower edge of a horizontally disposed angle iron gate stop 77 extended across the front of the end wall 13.

Each gate plate 74 slides behind the gate stop 77, and is provided with a flange piece 78 adapted to engage the top side of the gate stop. In this position, as indicated by the plate 74a in FIG. 5, the respective opening 15 is completely closed. And as indicated by the adjacent gate plate 74b in FIG. 5, the lower edge 79 of the plate 74b is spaced a predetermined distance above the bottom 67 of the reciprocally movable pan 24 disposed therebelow. To move each gate plate 74, a threaded screw 81 (FIG. 5) is secured at its lower end to the flange piece 78, and is threaded through a nut (not shown) rotatably mounted in a conventional manner within a tubular housing 82, and rotated by the drive shaft 83 of electric motor 84.

Within each compartment, a pair of baffle plates 86 and 87 (FIGS. 2 and 3) are mounted for providing the most advantageous flow of material toward the respective opening 15 for that compartment. The front plate 86 extends completely across the width of the compartment and extends from the wall 13 downwardly and rearwardly, the lower edge 88 disposed slightly above the pan unit 12. The rear plate 87 extends also across the width of the compartment and downwardly from the rear wall 46 and forwardly, the lower edge 89 disposed slightly behind and below the front plate lower edge 88, and within the respective pan for the compartment.

The reciprocating mechanism 28 is powered by an electric motor 91 (FIG. 2) mounted on a plate 92 at the rear 29 of the machine 10 and adapted to drive a chain 93 for driving in turn a sprocket wheel 94 (FIGS. 2 and 3). The wheel 94 is secured to the center of a transverse shaft 96 mounted in bearing units 97 and having a pair of eccentric cams 98 (FIGS. 3 and 4) secured thereto.

A sleeve 99 is rotatably mounted on a bushing 101 secured to each cam 98 and has a connecting rod 102 secured thereto. The forward end 103 (FIGS. 3 and 4) of each rod 102 is rotatably connected by another bushing 104 to a pin 106 pivotally connected between a pair of ears 107, both of which are secured to a bracket 108 mounted to the rear end wall 109 of the pan unit 22. Thus, upon operation of the motor 91, rotation of the drive shaft 96 results in rotation of the pair of cams 98 and reciprocation of the connecting rods 102 and also the pan unit 22.

The pan unit 22 is swingably suspended from the storage bin 12 by a pair of rock arms 111 and 112 (FIGS. 1 and 2) on each side of the bin 12 and pivotally connected at their upper ends to the side walls 49 of the bin 12 and at their lower ends to the outer ends 113 of an elongated rod 114 extended beneath and rotatably connected to the underside of the pan unit 22. An opening 116 is formed in the side wall 49 for each rod end 113 to accommodate the reciprocation thereof.

Referring to FIG. 2, it is seen that the reciprocation of the pan unit 22 is both longitudinal and vertical as illustrated by the two dotted line side elevation positions of the unit 22. To retard the rearward movement while increasing the forward and upward movement of the pan unit, to thereby ensure the granular material being moved forwardly of the compartments and through the discharge openings to fall downwardly upon the diffusing members 32 and thence to the mixing auger 35, a pair of coil springs 117 and 118 (FIGS. 3 and 5) are provided.

The upper ends of each pair of springs 117 and 118 are secured to a respective rod 114, and the springs are disposed downwardly and rearwardly with their lower ends secured to an angle iron 119 (FIG. 3) extended transversely across the frame 11. Thus, whereas the springs 117 and 118 are compressed upon the rearward movement or stroke of the pan unit 22, they expand upon the forward stroke and effect a rapid forward movement of the unit.

To operate the machine 10, a switch box 121 is provided for attachment to one side of the storage bin 12, whereby an individual switch 122 can be interposed in a line 123 from a source of power for each motor. Thus, the auger motor 59, the reciprocating motor 91, and all five adjustable gate motors 84 can be independently operated. By this arrangement, each respective opening 15 can be independently adjusted to provide for the mixing and blending of different materials from the compartments in different and predetermined ratios.

Some changes may be made in the construction and arrangement of my granular material mixing machine without departing from the real spirit and purpose of my invention, and it is my intention to cover by my claims, any modified forms of structure or use of mechanical equivalents which may be reasonably included within their scope.

I claim:

1. A granular material mixing machine comprising in combination:
   a frame;
   a bin for receiving granular material mounted on said frame, said bin including an end wall having an opening formed therein;
   means mounted in said bin for dividing said bin into a plurality of compartments, said bin having an opening formed in the bottom thereof for each of said compartments;
   means connected to said bin for receiving material through each of said bottom openings; and
   means for reciprocating said material receiving means to convey the material outwardly through said end wall opening, a spring means extending between said frame and said material receiving means adapted to be compressed when said material receiving means is moved in one direction to retard said movement of said material receiving means and adapted to expand when said material receiving means is moved in the opposite direction to convey said material toward said end wall opening.

2. A granular material mixing machine comprising in combination:
   a frame;
   an open bottomed, granular material storage bin mounted on said frame and including an end wall having two or more transversely spaced openings formed therein;
   means mounted in said bin for dividing said bin into two or more transversely spaced compartments common ends of which register with said openings;
   a U-shaped pan disposed below each compartment and adapted to receive granular material therefrom;
   rod means swingably connected to and extended between said bin and said pans thereby suspending each pan from said bin;
   means mounted on said frame for reciprocating said pans longitudinally of said bin whereby to convey material thereon toward said openings;
   means reciprocally mounted on said wall for adjustably covering each of said openings;
   a first baffle plate extended within each compartment downwardly and rearwardly over the forward end of said suspended means;
   a second baffle plate extended within each compartment downwardly and forwardly over the rear end of said suspended means; and
   mixing means on said frame below said end wall openings external of said compartments for receiving and mixing material discharged through said end wall openings, a spring means extending between said frame and each of said pans, each of said spring means adapted to be compressed when said pan is moved longitudinally of said bin to retard the movement of said pan and adapted to expand when said pan is moved longitudinally in the opposite direction to convey said material toward said end wall openings.

References Cited by the Examiner

UNITED STATES PATENTS

| | | | |
|---|---|---|---|
| 160,628 | 3/75 | Tullock | 222—199 |
| 408,156 | 7/89 | Wilson | 222—135 |
| 1,100,896 | 6/14 | Lokey | 222—200 X |
| 2,100,315 | 11/37 | Harper | 222—199 X |
| 2,153,030 | 4/39 | Venable | 222—199 |
| 3,008,188 | 11/61 | Harvey | 222—199 X |
| 3,035,739 | 5/62 | Berg | 222—135 |
| 3,074,599 | 1/63 | Fox | 222—413 X |

RAPHAEL M. LUPO, *Primary Examiner.*

HADD S. LANE, *Examiner.*